United States Patent
Bush

[15] 3,675,738

[45] July 11, 1972

[54] ENGINE SEALING

[72] Inventor: Vannevar Bush, 304 Marsh Street, Belmont, Mass. 02178

[22] Filed: March 2, 1970

[21] Appl. No.: 15,462

[52] U.S. Cl. ................................. 184/18, 92/144, 92/155, 277/26
[51] Int. Cl. ..................................................... F01b 31/10
[58] Field of Search ............... 92/155, 249, 250, 144; 184/18, 184/24; 277/DIG. 6, 26

[56] References Cited

UNITED STATES PATENTS

| | | | |
|---|---|---|---|
| 612,223 | 10/1898 | Airey | 277/26 |
| 2,413,751 | 1/1947 | Dennis | 92/144 |
| 626,611 | 6/1899 | Hay | 92/155 |
| 688,571 | 12/1901 | Airey | 277/26 |
| 1,306,640 | 6/1919 | Stapley | 92/155 |
| 2,942,668 | 6/1960 | Maly et al. | 277/26 X |

*Primary Examiner*—Manuel A. Antonakas
*Attorney*—Littlepage, Quaintance, Wray & Aisenberg

[57] ABSTRACT

Hot gas engines operating at constant maximum temperatures are sealed with solid lubricant unsplit piston rings. Bellows seal rods within pressurized crankbases.

8 Claims, 6 Drawing Figures

INVENTOR
VANNEVAR BUSH

INVENTOR
VANNEVAR BUSH

*Littlepage, Quaintance, Wray & Aisenberg*
ATTORNEYS

ENGINE SEALING

BACKGROUND OF THE INVENTION

Stirling cycle engines or hot gas engines have been known for many years. Widely recognized drawbacks have prevented commercial use, but advantages of these engines have engendered continued research to develop commercially useful Stirling cycle engines.

The employing of very high temperatures in hot cylinders of the engines produces excellent results in power output and in efficiency. In U.S. Pat. No. 3,457,722, bypassing, which makes such high temperatures attainable and practical, has been described; the operation of engines in cycles having long periods of low pressure has made bypassing practical. In a copending application Ser. No. 680,491, filed Nov. 3, 1967, hot gas engine compounding has been disclosed, which has made the use of high temperatures useful and practical.

Problems of sealing and lubrication are created by the high engine temperatures. Although hot gas engines and systems have utility with previously known sealing and lubrication systems and particularly with the lubrication system described in U.S. Pat. No. 3,457,722, the sealing and lubrication system described in the present case provides greater utility than systems heretofore available.

SUMMARY OF THE INVENTION

Solid lubricant disc piston rings with small central holes are described herein. A single piston ring in each cylinder is made of a suitable fused solid lubricant in the form of a rigid disc having a continuous periphery and having a relatively small central opening. Calcium fluoride is one example of a material which is suitable for use in the unsplit piston ring.

Each solid piston ring is cast and is ground to a diameter slightly smaller than an internal diameter of a cylinder, which is made preferably of honed stainless steel. A piston is made in parts to facilitate mounting of the solid piston ring, and the mounted piston is reciprocated in the cylinder, with the engine gradually being brought up to temperature, and the disc expanding so that it gradually wears to a precise fit in the cylinder. Once the engine is brought to full operating temperature, the disc is worn to the exact size to precisely fit the cylinder, and no further wear occurs. Since the disc is solid, and since it has very small central hole, expansion of the disc due to engine pressure is negligible. The disc operates with substantially no radial outward pressure normal to the interface of the disc and the cylinder. Side pressure of the disc is simply that which is sufficient to hold the piston in proper alignment in cooperation with the crosshead. Although gas passes the piston ring during starting and warming up of the engine, the efficiency loss during that portion of the engine use is not important. Moreover, any such loss is greatly greatly overbalanced by the long continuous trouble-free operation of the ring and by the lack of any contaminates transferred from the solid lubricant disc to the working gas.

The engine is constructed with solid lubricant bushings surrounding piston rods. The bushings are held between two polished plates which are oriented normal to the piston rods. Very little gas escapes the cylinders along the piston rods. To trap any gas which does pass the piston rods, and to prevent contamination of the piston rods, the cylinder interior and the working gas with lubricating oil from the crankbase, flexible bellows surround the piston rods at the point where they emerge from the cylinder. The flexible bellows may be made of neoprene rubber and may be reinforced at folds thereof to provide long wear in the crankbase and to withstand internal pressures in the bellows. The bellows may be connected through unrestricted passages to a gas storing chamber which is large with respect to the working gas capacity of the engine.

In some embodiments the bellows may be supported against rupture by pressurizing the crankbase to a pressure slightly below that within the bellows and storage chamber. A pump and control may be used to increase or decrease pressure within the crankbase to about 2 psi below chamber pressure.

The cylinders may be insulated so that the temperature of the working gas within the cylinders will stabilize. Because the high cylinder temperatures make cylinder head sealing difficult, cylinders and heads may be surrounded by covers which are relatively cool and which are tightly sealed to prevent gas loss.

A practical engine may be constructed with four double acting cylinders. Two double acting hot cylinders are mounted on one side of a crankbase, and two double acting cold cylinders are mounted on another side of the crankbase at a 90° angle to the hot cylinders. A first heater is connected to a first double acting hot cylinder and a second heater is connected to the second hot cylinder in a manner described in copending application Ser. No. 680,491. The cold cylinders are provided with coolers. Cold and hot cylinders are interconnected for cyclic gas flow.

Crossheads, which are mounted within the crankbase, are connected to piston rods. Connecting rods connect the crossheads with a crankshaft having two cranks at 180° intervals. Connecting rods from the crossheads which are connected to pistons within the first hot cylinder and first cold cylinder are connected to a first crank. Pistons within the second hot and cold cylinders are connected through crossheads and then connecting rods to the second crank.

The crankbase is designed to withstand about 200 psi. The cylinders are made of honed stainless steel. Maximum operating temperature in the first stage hot cylinder is about 1,200° F, and gas in the cold cylinders is about 200° F. The working gas is helium.

Temperature is held substantially constant, and power is varied by changing the system pressure as described in copending application Ser. No. 680,491. Maximum pressure at full load is about 1,000 psi; at idling load pressure is about 100 to 200 psi. The whole system is hermetically sealed. Pistons are made in two axial parts. A single piston ring in each cylinder is made of fused calcium fluoride in the form of a ring. Pistons have about 0.005 to 0.010 inch clearance from cylinder. Rings are reasonably closely fit to cylinders when cold. The coefficient of expansion of the ring is greater than that of the stainless steel of piston and cylinder. Hence, given a loose original fit, and with cylinder temperature gradually raised, the ring will wear to a fit in the hot cylinder. Central holes in the rings are about ½ inch diameter and are closely fit to central rod of piston when cold. The small central hole has two advantages. Forces tending to expand the rings due to working gas pressure are relatively small. Hence, changes of ring diameter due to pressures are small, and no great tensile strength of ring is called for. When hot, a ring has a loose fit at its center, but clearance there is small.

The ring cannot move far from central location in a piston, and the piston itself cannot come into contact with cylinder. The piston is held in line by the ring and by the crosshead guides in the crankbase. Each cylinder temperature is nearly uniform and constant at all loads; the disc wears to good fit at that temperature and practically ceases to wear thereafter.

Where piston rods emerge from the cylinder, they are surrounded by calcium fluoride bushings. The bushings are free to move slightly from center, and their faces ride on polished plates for a seal.

Crosshead and crankshaft lubrication is accomplished using conventional splash lubrication. Points where piston rods emerge into the crankbase are sealed by reinforced neoprene rubber bellows.

On stopping, hot gas may flow past the piston rod sleeve down inside the bellows. Gas in the bellows is passed to a large volume storage chamber which is mounted inside or outside of the crankbase. Leakage along the piston rod sleeves is slow enough to be masked by operation of the power control. The rubber bellows are constructed with a ring of impregnated fabric at the bottom of each corrugation which enables the bellows to take much high internal pressure.

In some applications the bellows may sustain the chamber pressure which may be about 50 psi. In a preferred engine, the crankbase is sealed, and a small motor operates a pump to maintain crankbase pressure 1 or 2 psi below the storage chamber pressure. A motor control may be left on at all times to maintain pressure in the crankbase. The crankshaft is well sealed, and the motor seldom operates. The control may operate the motor in either direction, to follow changes in chamber pressure on cooling, or the like, so as to always maintain a low net pressure on the bellows.

One object of this invention is the provision of sealing means for high temperature hot gas engines.

A specific object of this invention is the provision of high temperature unsplit piston rings made of solid lubricant, which wear into exact fit with cylinders, and which develop negligible normal forces with respect to the internal surfaces of the cylinders.

Another object of this invention is the provision of high temperature piston rod seals having solid lubricant bushings with central piston rod receiving holes which are mounted between parallel polished plates.

A further object of this invention is the provision of high temperature piston rod seals comprising flexible bellows attached to piston rods and to a crankbase.

Further objects of the invention will be apparent from the disclosure in the specification and drawings.

DETAILED DESCRIPTION OF THE DRAWINGS

Figure 1:
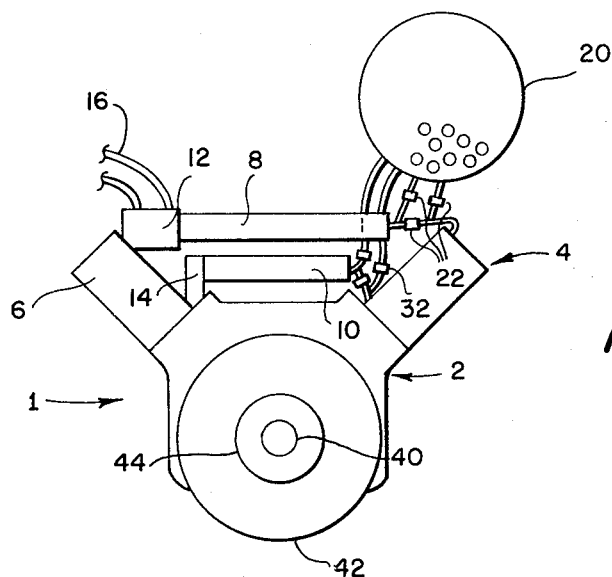
FIG. 1 is a schematic front view of a hot gas engine.

Referring to the drawings, engine apparatus is generally referred to by the numeral 1. A crankbase 2 supports first-stage hot cylinder 4 and cold cylinder 6. The cylinders are double acting. Upper ends of the cylinders are connected through 8, while the lower ends of the cylinders are interconnected through 10. Coolers 12 and 14 are connected at ends of cold cylinder 6, and cooling water is circulated through tubes 16. Furnace 20 is used to heat working gas in the system. Solenoid valves 22 control gas flow in upper hot cylinder 4, heater 20 and cold cylinder 8. Valves 32 operate in the same manner to control the passage of gas between the lower ends of cylinder 4 and 6 and heater 20. Crankshaft 40 supports a flywheel 42 and a commutator 44 which controls the operation of 26 and 32. Similar second stage hot and cold cylinders are positioned directly in back of cylinders 4 and 6.

Figure 2:
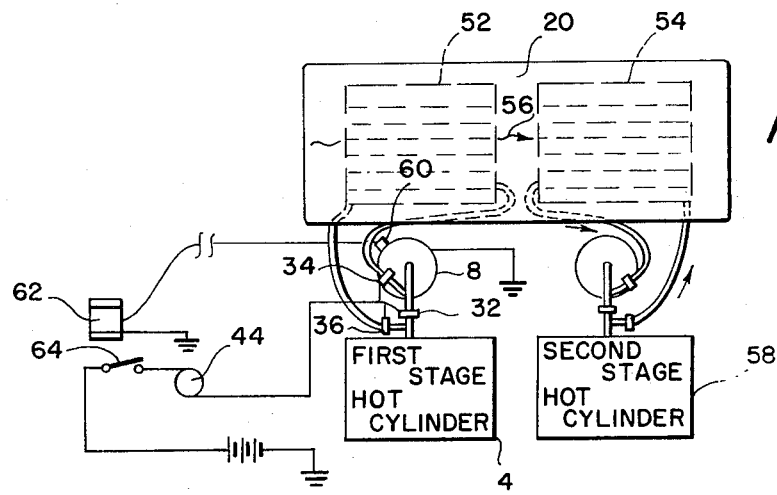
FIG. 2 is a schematic representation of heater, hot cylinder and control valve apparatus for the engine.

As schematically shown in FIG. 2, furnace 20 contains first-stage heater 52 and second-stage heater 54. Ignition occurs at the left side of furnace 20 and hot furnace gases flow through the furnace in a direction shown by arrow 56. Working gas from the first-stage hot cylinder 4 flows through solenoid valve 34 into heater 52 and out through solenoid valve 36 in counterflow to the direction of furnace gases. A similar counterflow occurs in the second-stage heater 54 which is connected through similar solenoid valves to second-stage hot cylinder 58. Pipes associated with heaters conducting gas to and from the system are well insulated. Consequently, the length of the pipes and the position of the furnace with respect to the hot cylinders is not significant.

Furnace temperature is maintained at a uniform value by a conventional thermostat which controls the operation of the forced air fan and fuel admission. Engine temperature is maintained at a maximum value by thermostat 60 mounted at the hot end of the first-stage gas passage 8. Thermostatic element 60 controls relay 62 which opens switch 64 upon excess temperature sensed by thermostat 60. The opening of switch 64 interrupts the cyclic operation of normally closed solenoid valves 34 and 36 and normally open solenoid valve 32. Gas heating thereby ceases, reducing the temperature in cylinder 4. The second-stage hot cylinder is maintained at a constant temperature by a similar thermostatic control.

Figure 3:
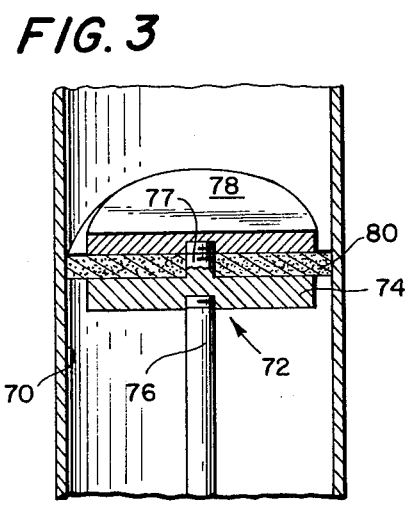
FIG. 3 is a detail of an unsplit piston ring assembled in a piston.

Referring to FIG. 3 a honed stainless steel cylinder is generally represented by the numeral 70. A piston generally indicated by the numeral 72 is reciprocated within cylinder 70. Piston 72 is constructed in two axial parts to facilitate the assembling of the piston and ring before the inserting of the piston into cylinder 70. A lower part 74 of piston 72 is connected to piston rod 76 by a convenient rigid means. An upward projection 77 on lower portion 74 of the piston assembly extends through a hole in the sealing ring for rigidly mounting an upper portion 78 of piston 72. Sizes of the elements in FIG. 3 are exaggerated; for example, a clearance of about 0.005 to 0.010 inch is sufficient between piston 72 and cylinder 70.

Figure 4:
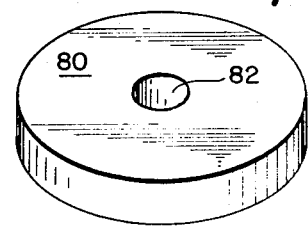
FIG. 4 is a perspective detail of a piston ring of FIG. 3.

A solid lubricant calcium fluoride ring 80, as also shown in FIG. 4, is mounted between the portions 74 and 78 of piston 72. Ring 80 has a unitary construction, and central hole 82 is small, for example, about one-half inch to reduce influence of gas pressure in expanding the ring. Ring 80 is cast and then ground to an outer periphery slightly smaller than the internal dimension of cylinder 70. The ring expands at a greater rate than the cylinder upon heating, consequently the disc 80 wears to an exact fit in cylinder 70 when the latter is slowly brought up to operating temperature. Since the temperature of cylinder 70 is maintained at a constant level, the ring 80 has a definite size at the operating temperature. Consequently, negligible radial force is exerted against the internal wall of cylinder 70 in operation of the piston.

Figure 5:
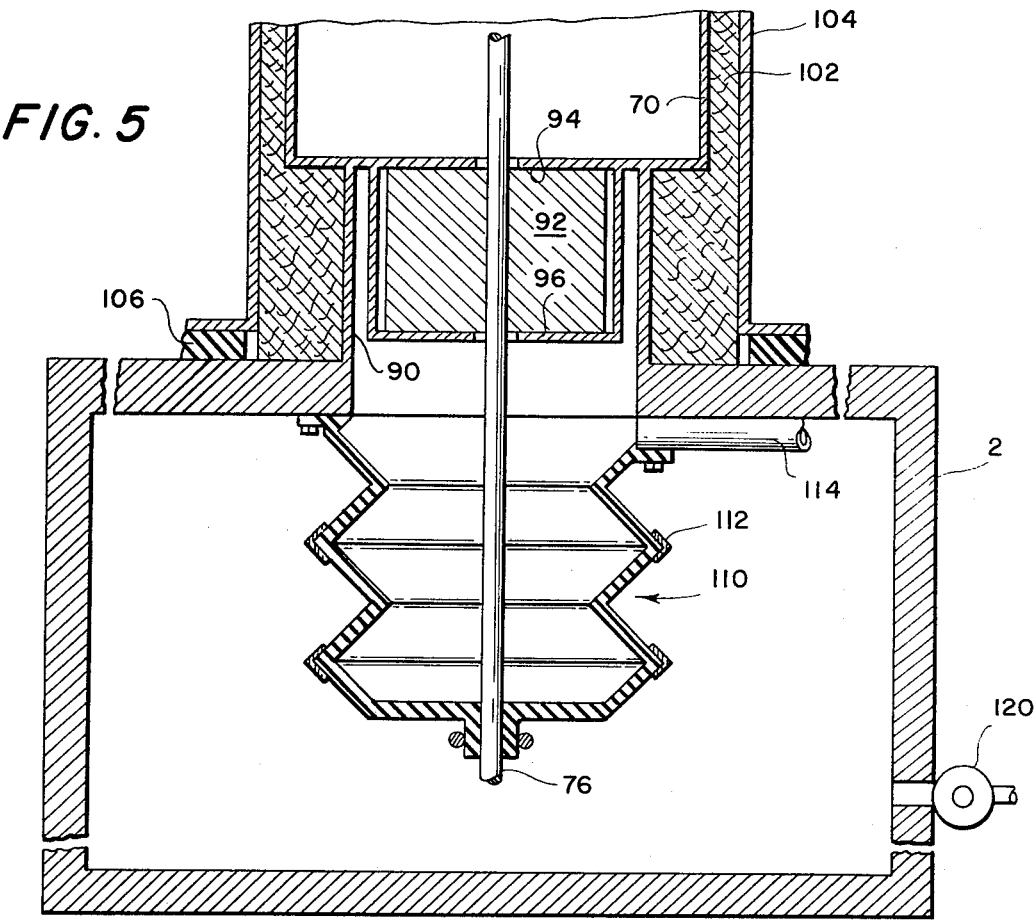
FIG. 5 is a schematic detail of a piston rod seal and a gas trap bellows.

As shown in FIG. 5, cylinder 70 is mounted upon a thin walled tube 90 to thermally isolate the cylinder from the crankbase 2. A solid lubricant calcium fluoride bushing 92 is mounted between parallel polished plates 94 and 96. Plates 94 and 96 have central openings which are slightly larger than piston rod 76. To maintain the temperature of cylinder 70 constant, the cylinder is surrounded with insulation 102 or a void. Since it is difficult to maintain an absolute hydrogen seal at the cylinder head at operating temperatures of the cylinder, an integral gastight cover 104 is placed over the cylinder and is sealed by a gasket 106 to the crankbase.

Figure 6:
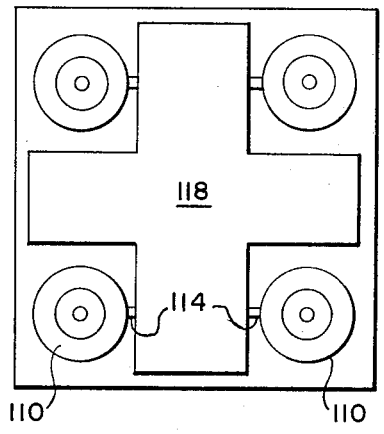
FIG. 6 is a schematic detail of a possible bellows and working gas storage chamber interconnections.

As also shown in FIG. 5, a neoprene rubber bellows 110 is sealed to piston rod 76 and to an internal wall of crankbase 2. The rubber bellows is reinforced at folds 112 to sustain internal pressure within the bellows. Tube 114 leads working gas trapped in the bellows to a storage chamber 118 within the crankbase as shown in FIG. 6. The bellows 110 is cooled by oil droplets which originate from a conventional crankshaft splash lubrication system not shown.

Crankbase 2 is pressurized with a pump 120, which is controlled so that the pressure within crankbase 2 is about 2 psi more than the pressure of the working gas in the bellows and storage chamber 118. The constantly maintained low pressure differential relieves the bellows from stress and insures that no leaks may occur from the crankbase toward the working gas volume.

Although this invention has been described by specific details of one or more preferred embodiments, it will be obvious to those skilled in the art that several adaptations and modifications may be made without departing from the teachings of this invention. The unsplit continuous periphery piston ring seals of the present invention have application as seals in all expansible chamber devices wherein a relatively soft and wearable solid material may be employed as seal between chamber forming elements. The scope of the invention is defined only in the following claims, which are an integral part of the disclosure.

That which is claimed is:

1. Sealing apparatus for an expansible chamber device comprising relatively movable first and second chamber forming elements defining a continuous gap therebetween, a uniform unsplit solid lubricant seal having a continuous and uninterrupted periphery mounted on one of the elements and extended into the gap toward the other element, heat controlling means connected to the device for maintaining temperature of the elements at substantially constant operating temperature, whereby the seal is spaced from the other element at subnormal operating temperatures and whereby the seal extends close to the other element at normal operating temperatures, substantially closing the gap and providing substantially no normal pressure against the other element.

2. The sealing apparatus of claim 1 wherein the solid lubricant element is a fused calcium fluoride element.

3. Sealing apparatus of claim 1 wherein the first and second elements respectively comprise a piston and a cylinder, and wherein the seal comprises an unsplit solid lubricant ring mounted on the piston and extending outward therefrom toward the cylinder whereby the ring is spaced from the cylinder at subnormal temperatures and extends close to the cylinder at operating temperature.

4. Sealing apparatus for an expansible chamber device comprising a relatively moveable piston and cylinder defining a continuous gap therebetween, the piston having first and second axially spaced parts inter-connected by a projection fixed axially on one part and connected to the other part, an unsplit solid lubricant ring mounted on the piston and positioned between the first and second parts, the ring having a continuous and uninterrupted periphery and having a central opening through which the piston projection passes, heat controlling means connected to the device for maintaining temperature of the device at a substantially constant operating temperature whereby the ring is spaced from the cylinder at subnormal operating temperatures, and whereby the ring extends close to the cylinder at normal operating temperature substantially closing the gap, and providing substantially no normal pressure against the cylinder.

5. The apparatus of claim 4 having a crankbase, a crankshaft mounted for rotation in the crankbase, wherein the cylinder is mounted on the crankbase, wherein the piston is mounted in the cylinder for reciprocal movement therein, rod means interconnecting the piston and the crankshaft, lubricating means associated with the crankshaft means, sealing apparatus comprising first and second spaced and parallel plates connected at a longitudinal end of the cylinder, the plates having central openings for passing a position of the rod means therethrough, a solid lubricant bushing positioned between the first and second plates and having a central opening for receiving a portion of the rod means, the openings in the plates being relatively larger than the opening in the bushing, whereby bearing of the bushing on the rod means and on the plates seals the cylinder.

6. The apparatus of claim 4 having a crankbase, a crankshaft mounted for rotation in the crankbase, wherein the cylinder is mounted on the crankbase, wherein the piston is mounted in the cylinder for reciprocal movement therein, rod means interconnecting the piston and the crankshaft, lubricating means associated with the crank-shaft means, sealing apparatus comprising a flexible bellows having a first end connected to the rod means within the crankbase and having a second end connected to the crankbase around the rod means whereby gas leaking from the cylinder is caught in the bellows.

7. Sealing apparatus of claim 6 comprising further working gas storage chamber connected to the bellows, an enclosure about the bellows, and a pressurizing means connected to the crankbase for maintaining pressure therein slightly below working gas pressure in the storage chamber.

8. Sealing apparatus for an expansible chamber device comprising a relatively moveable piston and cylinder defining a continuous gap therebetween, the piston having an axial projection, a solid lubricant sealing ring mounted on the piston, the sealing ring having a continuous and uninterrupted periphery and having a central opening which receives the piston projection for holding the sealing ring on the piston, heat controlling means connected to the device for maintaining temperature of the device at a substantially constant operating temperature whereby the ring is spaced from the cylinder at subnormal operating temperatures, and whereby the ring extends close to the cylinder at normal operating temperature substantially closing the gap, and providing substantially no normal pressure against the cylinder.

* * * * *